United States Patent [19]

Noakes

[11] 3,898,463
[45] Aug. 5, 1975

[54] SCINTILLATION COUNTING APPARATUS
[75] Inventor: John E. Noakes, Athens, Ga.
[73] Assignee: Task, Inc., Oak Ridge, Tenn.
[22] Filed: Aug. 13, 1973
[21] Appl. No.: 387,764

[52] U.S. Cl. .............................. 250/367; 250/369
[51] Int. Cl. ............................................. G01t 1/20
[58] Field of Search .......... 250/328, 361, 362, 363, 250/366, 367, 369

[56] References Cited
UNITED STATES PATENTS

| | | | |
|---|---|---|---|
| 2,855,520 | 10/1958 | Stoddart et al. | 250/361 |
| 3,591,807 | 7/1971 | Mays et al. | 250/366 |
| 3,663,816 | 5/1972 | Scherzer et al. | 250/328 |

Primary Examiner—Archie R. Borchelt
Assistant Examiner—Davis L. Willis
Attorney, Agent, or Firm—John G. Schenk

[57] ABSTRACT

In the measurement of radiation by means of scintillation counters one drawback has been the scarcity of radiation counters which efficiently measure both gamma and beta radiation. There has also been the problem of scintillation counting in the face of external or background radiation. A scintillation counting apparatus is provided herein which measures scintillations arising from both beta and gamma radiation. The apparatus also effects a better separation of sample radiation from background radiation. The apparatus can also be used solely as a gamma detecting instrument. In such apparatus a radioactive sample, is placed in a housing coupled to a photomultiplier. In this apparatus the housing itself is an inorganic phosphor.

11 Claims, 8 Drawing Figures

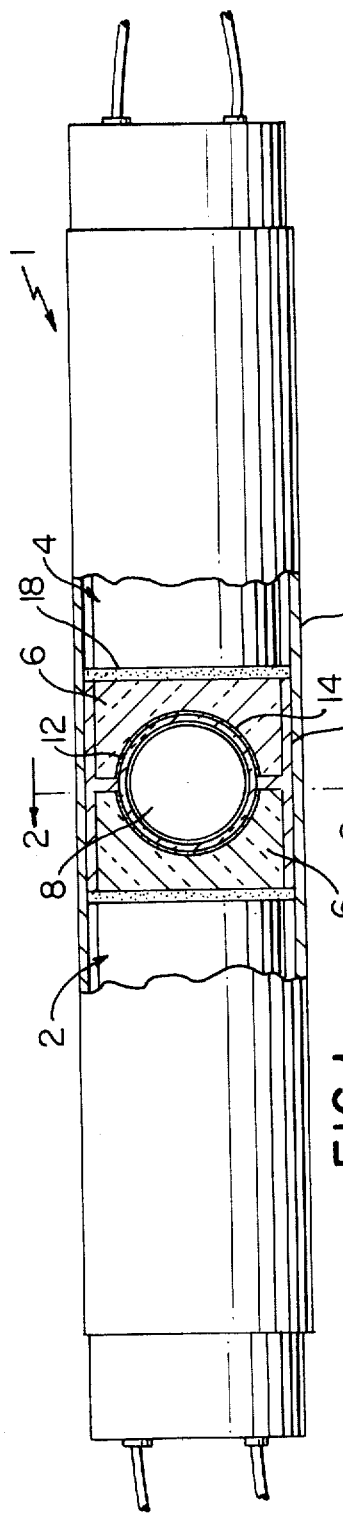
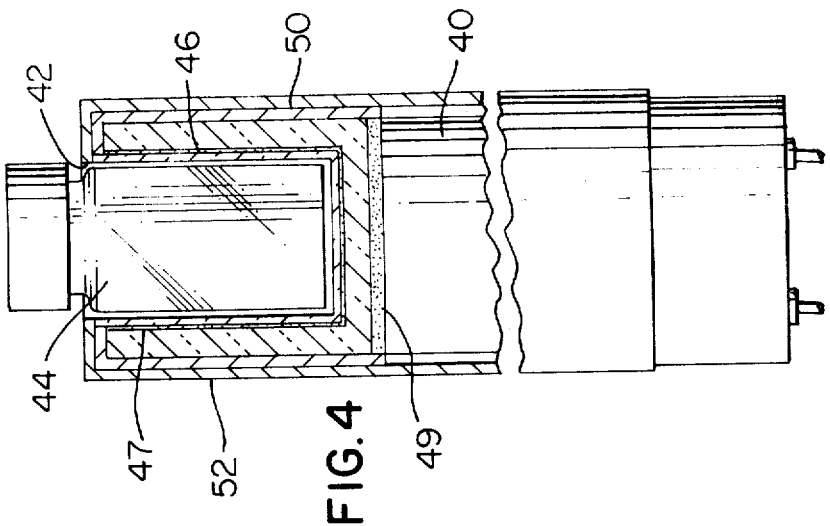
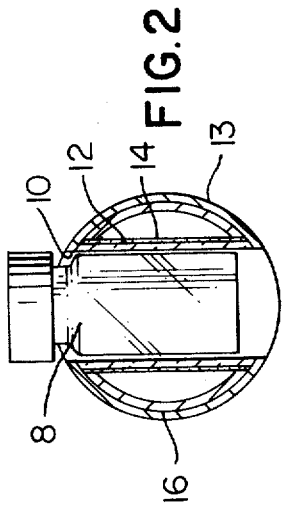
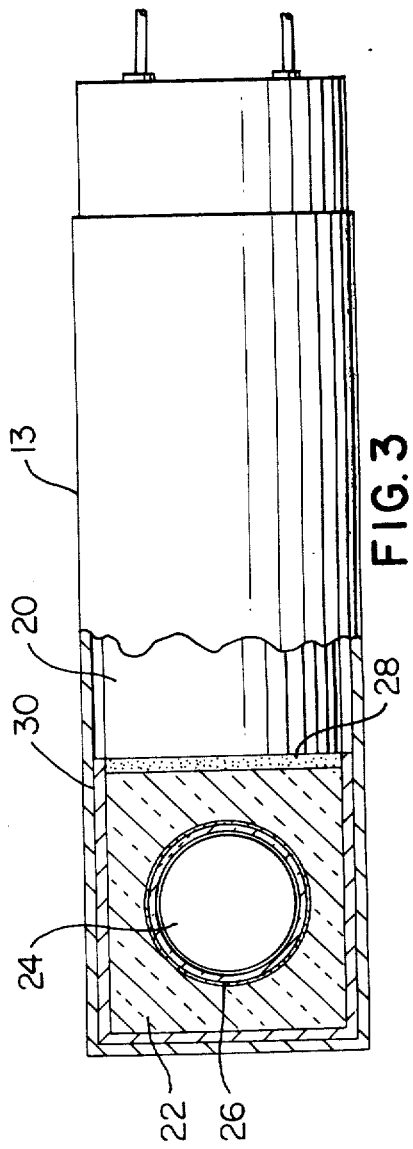
FIG. 1
FIG. 2
FIG. 3
FIG. 4

SCINTILLATION COUNTING APPARATUS

BACKGROUND OF THE INVENTION

This invention relates to the accurate measurement of radiation by means of scintillation counters. In a particular aspect, the invention relates to the liquid scintillation counting of soft beta radiation. In another aspect, the scintillation measurement of gamma radiation.

The importance and use of radioactive materials has grown extensively in the last 25 years. In the field of medicine, radioisotopes have attained such extensive application that a whole new field called nuclear medicine has originated. The two most important groups of radioisotopes that are used today are those that emit gamma and beta radiations. Gamma radioisotopes such as $^{125}I$, $^{60}Co$ and $^{137}Cs$ find wide application in diagnostic and radiation therapy. Beta radioisotopes such as $^{3}H$, $^{14}C$ and $^{32}P$ are used with labeled compounds for medical tracer studies.

The one drawback in the past use of both of these groups of radioisotopes has been the scarcity of radiation counters which can efficiently measure both gamma and beta radiation. This is not suprising since beta particles are charged energetic electrons and gamma radiation consists of electromagnetic rays. The two are thus different in their radiation properties and therefore different in their interaction with matter such as in nuclear radiation detectors.

Scintillation gamma counters are well known, and employ a scintillating crystal or phosphor in the form of certain known inorganic materials such as sodium iodide or cesium iodide activated with thallium, or lithium iodide activated with europium. The phosphor is in optical alignment with a photomultiplier, which in turn is generally connected to a linear amplifier, followed by a frequency meter or a pulse height selector. The photomultiplier is a well known device in which a photocathode produces electric current response to impingement of light, i.e., photons. At the output of the photomultiplier electric pulses generated in response to photons impinging on the photocathode are amplified to a significant level such that they can be measured by known means.

In recent years liquid scintillation counting has replaced geiger and proportional counting as the preferred choice for the measurement of soft beta activity. This preference has been motivated by the versatility of liquid scintillation apparatus in accomodating a wide variety of samples with minimum sample preparation. Liquid scintillation counting also leads to higher counting efficiency in the face of background radiation. In liquid scintillation counting a beta decay event occurs, followed by energy transfer through a liquid solution to the scintillator which, in turn, emits light. Further, a secondary scintillator may be present to absorb these primary emissions and re-emit at a longer wave length. In order to count soft beta decay events, usually a sample carrying traces to radioactive isotopes to be counted is dissolved or suspended in a solvent system which has been selected for its capability of absorbing and transmitting energy originating from beta decay events without attenuating that energy significantly. Aromatic hydrocarbons such as toluene, benzene or xylene are solvents of general choice. When, because of the nature of the materials being examined, these solvents are not suitable, other non-polar solvents such as dioxane, dimethaxyethane or Cellosolve can be used to increase their cocktail miscibility. The solvent also contains a scintillator, a material which, when activated by the beta decay energy transmitted through the solvent, gives rise to light scintillations. The two most prominent scintillators today of importance in routine liquid scintillation counting are p-terphenyl and 2,5-diphenyloxazole (PPO).

The early liquid scintillation measuring systems utilized a single photomultiplier having a number of multiplier dynode plates for the purpose of multiplying the light received from the scintillation fluid. The output from the photomultiplier was then amplified and analyzed in a pulse height analyzer. Due to inherent noise produced in this system, derived from electronic or outside radiation, accurate measurements were often not obtainable. Liquid scintillation counting, therefore, did not become a practical means for low level beta measurement until other means for controlling these problems were resolved.

Perhaps the most important factor contributing to the furtherance of low level beta activity measurement is the utilization of coincident counters. In these devices a sample is examined by two photomultipliers. Only if both tubes produce an output pulse within a coincident resolving time is the pulse considered to arise from a legitimate decay event. Even in coincidence counters, however, external or background radiation has been a problem. In order to eliminate external radiation such counters use massive shielding, usually 3 inches of lead, has been used to surround the liquid sample. However, some radiation still penetrates the shield. Recently electronic guards consisting of scintillating material, such as NaI(T1) crystal or plastic phosphors have been employed as shields to further eliminate external radiation. However, these electronic guards have been placed outside of the lead shielding.

A different solution to the problem of cosmic radiation is provided in U.S. Pat. No. 3,225,194. However, in this apparatus the guard assembly is an independent scintillation detector having its own scintillation material and photomultiplier tubes and it is wholly optically isolated from the liquid sample. A low background liquid scintillation counter for beta measurement is provided using coincidence and anticoincidence gating. Electronic circuitry converts detector scintillations into constant fast rise time pulses of fixed amplitude which are independent of the intensity of the initial detector fluorescence and therefore provide no means for energy analysis. Another independent guard assembly is shown in U.S. Pat. No. 3,246,151.

In the scintillation apparatus provided herein background radiation is less of a problem than heretofore. The scintillation counter of the invention can be used as a low level liquid scintillation counter where background radiation can be simultaneously counted and sorted from true beta decay events by use of an integrated radiation-guard counter.

In accordance with the practice of the invention a highly efficient liquid scintillation counting apparatus is provided which enables simultaneous detection of scintillations arising from both beta and gamma radiation originating in the liquid sample or from external origin. An apparatus is also provided which eliminates the massive lead shielding generally used in such scintillation counters. The invention also provides for the determination of the origin of photon production by pulse shape as well as by pulse height.

SUMMARY OF THE INVENTION

A scintillation counter is provided herein which is not only extremely useful as a coincidence counter, but one which is so effective that it can be used with only one photomultiplier tube. The apparatus can also be employed solely as a gamma ray detecting instrument, the sample vessel containing only a gamma ray emitting isotope.

One of the important aspects of the scintillation counting apparatus of this invention is a counting chamber or vessel of an inorganic phosphor. This phosphor is a crystalline material in the form of an elongated solid made from one or two large crystals or small scintillating crystals held together by a suitable binder. A well is provided in the elongated phosphor, adapted to receive and substantially surround a sample vessel which will contain either a radioisotope in a liquid cocktail or a solid radioisotope. The well is lined with an optical liner, a highly transparent substance having a high photon transmittancy and a refractive index similar to that of the inorganic phosphor. The optical liner seals the inorganic phosphor surfaces at this interface from atmospheric attack. A sample vessel is adapted to fit slideably within the liner. The sample vessel and the well liner both have photon absorbency values of less than twenty percent at wavelengths of 3500A to 4200A.

The sample vessel thus is optically coupled to the inorganic phosphor by means of the well lining. A photodetector in optical communication with the inorganic phosphor material is positioned in alignment with the well. Optical sealing means having optical properties and refractive indexes similar to the well liner couple the photodetector face to the surface of the inorganic phosphor. A photon reflecting coating means covers all of the surfaces of the inorganic phosphor except those at the interface of the phosphor and the photodetector, and of the phosphor and the well liner. This coating means prevents escape of photons which are transmitted from the liquid sample to the photodetector, or which originate in the counting chamber when counting gamma samples or due to external radiation. This coating has a high reflectivity at 3500A to 4500A wavelengths. A metal casing surrounds the inorganic phosphor and the photodetector face sealed thereto. The housing has a sample vessel door, thus forming a light-tight housing, and electronic circuit means are provided for summing electric pulse signals from the photodetector, for amplifying some of the summed signals, for performing pulse shape or pulse amplitude discrimination of the signals and for analyzing the signals.

DETAILED DESCRIPTION OF THE INVENTION

In accordance with the practice of this invention various improvements in liquid scintillation counters are provided. First, a new type of electronic radiation guard which surrounds the sample vial is placed between and optically coupled to the photomultiplier tube counting the scintillations. Second, an electronic circuit measures the difference in rise and/or decay time of the sample and the crystal guard and differentiates them according to this difference rather than their pulse heights. Third, the use of the crystal guard as a gamma detector enables broad use of the liquid counter to efficiently count gamma radiation as well as beta radiation. These improvements, as well as other advantages of the invention will, perhaps, be best understood from the following explanation in connection with the accompanying drawings.

As will be seen from the drawings there are three general configurations in which the detector-guard crystal of the invention can be fabricated in an integral component of a liquid scintillation counter.

In the drawings, FIG. 1 is a top view, partially broken away, showing one form of the scintillation apparatus. The electronic components activated by the scintillations are, of course, not shown.

FIG. 2 is a cross sectional view taken along lines 2—2 of FIG. 1.

FIG. 3 is a top view similar to FIG. 1, but showing a different embodiment of the invention.

FIG. 4 is a top view of still another embodiment of the invention.

Figure 5:
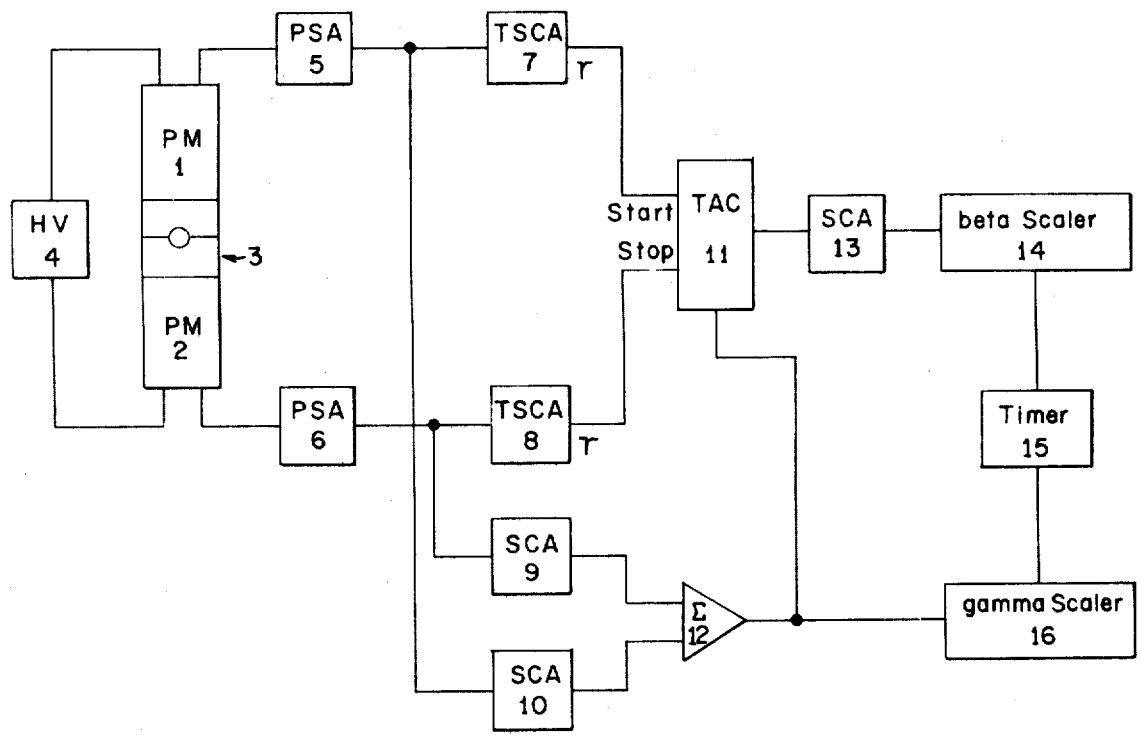
FIG. 5 is a block diagram illustrating, in preferred configuration, the electronic circuitry.

FIG. 1 shows liquid scintillation counter 1 with two photomultiplier tubes 2 and 4 in which a scintillation crystal[6] composed of NaI(T1), CsI(T1) or like material completely surrounds a liquid vial 8 and acts as a sample vessel. The vessel, which also functions as a guard as well as a detector, is constructed of a single crystal or two or more bonded crystals in a cylindrical configuration with a center hole 10 of a diameter to allow a liquid scintillation vial 8 to pass into it and through it if necessary. Typical scintillating materials have been mentioned such as NaI(T1). These materials are hydroscopic and hence must be protected from moisture in the air. Accordingly, as shown in FIG. 2 the inside wall of the counting chamber is constructed of a quartz sleeve 12.

Quartz is chosen because it has low optical density for a 3350–4200 Angstrom photon, which is the wave length emitted during the scintillation of the liquid fluor. Quartz sleeve 12 is fastened by epoxy glue or other binder with similar optical properties so as to be air tight, to an aluminum container or housing 13, desirably of approximately 0.1–1.0 mm wall thickness that shields the walls of the crystal detector from moisture and light and acts as a support for fastening the crystal to the phototube housing. As implied since the quartz sleeve must present a good optical window, it is optically coupled to the crystal detector-guard using epoxy glue (refractive index 1.52–1.55) or silicone grease (refractive index 1.45–1.50) 14 which has good optical clarity and a refractive index similar to that of amorphous quartz (refractive index 1.41–1.46) and NaI(T1) crystal (refractive index 1.68). In order to minimize the photon loss on the walls of the crystal detector-guard, a reflecting surface of oxides 16 of such metals as aluminum, barium, lead, etc., in the form of a powder or paint is applied so that is lies on the outer surface of the crystal and between the crystal and aluminum walls of the container. Also, where the crystal detector-guard is made of two crystals, for the ease of construction and/or cost, such as is shown in FIG. 1, the reflector material is not only on the side walls of the crystal, but extends to all walls of crystal except at the interface of the quartz sleeve and phototube face. In order that photons within the crystal can traverse through and out of the crystal to enter the phototube with a minimum of reflection and refraction, an optical couple 18 of epoxy glue with a refractive index 1.50–1.55 or a silicone grease of refractive index 1.45–1.50 is also used to couple the crystal to the face of the phototube. The quartz sleeve 12 is shown in FIG. 2 extending through the detector. An advantage is to be gained by this feature in that it allows a moveable piston or elevator to automatically position the sample vial within the crystal detector-guard from a position above the crystal. This feature allows automatic handling of the vial suitable for multisample counting, but does reduce somewhat the detection and guard qualities of the crystal. A quartz sleeve with a bottom does present better detector and guard qualities, but it prohibits transfer of the glass liquid vials within and out of the crystal by an elevator, unless the lifting means are attached to top of the counting vial. Whereas the detector-guard shown in FIG. 2 is not light tight to external photons coming in around the upper and lower openings of the counting chamber used to introduce the sample, the whole crystal and phototube comprising the detector-guard will be operated under light-tight conditions so that no external photon energy will enter around the vial and light shock the phototubes.

FIG. 3 shows a configuration of a crystal detector-guard having a single phototube 20. This detector-guard is identical to a two phototube detector-guard except that the crystal 22 has the single phototube optically coupled to it. The glass vial 24 containing the liquid sample is positioned within the crystal guard, either from a top or bottom opening in the detector-guard. A quartz sleeve 26, identical to that of the two phototube configuration, is used to act as an optical window to allow photons originating in the liquid sample to enter the crystal detector-guard and to prevent moisture from entering and reacting with the crystal material. The quartz sleeve extends through the entire crystal detector and is joined and sealed by epoxy glue to the aluminum housing which covers the entire crystal and to the adjoining phototube. The quartz sleeve is optically coupled to the crystal and adjoining phototube. The quartz sleeve is optically coupled to the crystal by epoxy glue or a silicone grease and the same means is used to optically couple the crystal to the phototube face 28. A metal oxide reflector powder or paint 30 is used on all outer surfaces of the crystal except at the interface of the quartz sleeve and phototube face where optical transmission is required. The surface of the crystal that was shown connected to the other phototube in FIG. 1 is, in FIG. 3, completely covered with reflector material. The purpose of this reflector surface is to insure that the single phototube collects as many of the emitted photons as possible from both the liquid and crystal detector-guard. This detector-guard; as was previously described in the two phototube unit, is sensitive to external light penetrating the top and bottom entry orfice where the liquid sample is introduced and withdrawn. Therefore, this detector must also be operated under light-tight conditions.

FIG. 4 shows another configuration of a single phototube 40, detector-guard crystal unit that can be used in conjunction with a liquid scintillation counter. This one phototube detector-guard is similar in construction to the single phototube crystal detector-guard shown in FIG. 3 except that the sample entry port 42 is oriented 90° and that the counting chamber does not extend the full length of the crystal. There is only one opening in the crystal, that being used for both entry and withdrawal of the sample. The advantage of this configuration is that the crystal detector-guard has greater ability to transmit photons from the liquid sample to the phototube, since the geometry of the crystal favors superior reflective properties. Also the crystal detector-guard is more efficient as a guard and as a detector since there is more crystal material surrounding the glass vial 44. The quartz sleeve 46 is in the shape of a vial with one end open and the other closed. The quartz vial fits into a well in the crystal and is optically coupled to the crystal with epoxy glue or silicone grease 47 or all surfaces except where it joins the aluminum outer shield at the top of the detector. At the bottom of the crystal where the crystal interfaces with the phototube, another optical couple is used made with the same epoxy glue or silicone grease 49. Reflector material 50, as previously described, is placed on all outer surfaces of the crystal, between the aluminum cover 52 and the crystal, except where at optical surfaces of the quartz vial and contact with the phototube face. As in the other two configurations of the crystal detector-guard, FIG. 4 configuration is also sensitive to entry of external photons if the detector-guard is not operated in a light-tight housing. Photons other than those originating from the liquid fluor or from the scintillations within the crystal can enter from the top entry port. This fact does require that no external photons be permitted during crystal detector-guard operation.

In the two-tube counting system (FIG. 5), the NaI(Tl) radiation detector-guard is placed in optical communication with photodetectors PM1 and PM2 as previously described. Bialkali cathode, gallium phosphide dynode, end-on photomultiplier tubes having sub-nanosecond rise time were chosen for high quantum efficiency and low dark current are used as photodetectors PM1 and PM2.

The fast signals from the 50 ohm anode output of PM1 and PM2 are analyzed by pulse shape analyzers PSA-5 and PSA-6. The pulse shape analyzer produces a 0-10V output with an amplitude that is proportional to the shape (rise time and/or decay time) and independent of the amplitude of the incoming signal.

The pulse shape analyzer will generate output pulses of very different amplitude for events originating in the liquid scintillator as compared to events originating in the crystal scintillator due to the vast different in fluorescence rise and/or decay time of the two scintillators.

The output of PSA-5 is analyzed by two pulse height analyzers, TSCA-7 and SCA-10. The upper and lower level discriminators of TSCA-7 are set to accept only those fast pulses which originate in the liquid scintillator, where as the upper and lower discriminator of SCA-10 are set to accept only those pulses which originated in the crystal scintillator. Likewise, pulse height analyzers TSCA-8 and SCA-9 analyze the output of PSA-6. The output of TSCA-7 and TSCA-8 is a fast negative timing pulse of less than 5 nanoseconds rise time and less than 20 nanoseconds duration. The fast output of TSCA-7 is used as a start trigger of a time to amplitude converter TAC-11 while the output of TSCA-8 is delayed approximately 25 nanoseconds and used as the stop trigger by the time converters.

Delaying the output of TSCA-8 by 25 nanoseconds guarantees the stop trigger will arrive after the corresponding start trigger for all coincidence events. The time converter TAC-11 generates a bi-polar pulse whose amplitude is porportional to the difference in the time of arrival of the start and stop trigger pulses. The time converter is constructed such that if a stop trigger is not received within some preset time interval, usually 50 or 100 nanoseconds, after a start, the converter will reset and accept another start without producing an output pulse. The output of TAC-11 is analyzed by a pulse height analyzer SCA-13 whose upper and lower discriminators are set to define a time window of approximately 20 nanoseconds. The output of SCA-13 is a +5 volt unipolar pulse of approximately 0.5 microsecond duration. These pulses are recorded by a counting register, beta scaler 14, which counts the number of coincidence events which originate in the liquid scintillator. Timer-15 controls beta scaler 14 so that count rates may be determined.

The slow unipolar outputs of SCA-9 and SCA-10 are added in a summing amplifier ε-12 and presented to a counting register gamma scaler 16 which counts all events which originate in the crystal scintillator. The output of ε-12 may also be used as an anticoincidence gate for TAC-11 to prevent beta scaler 14 from recording a pulse whenever an event is detected in the crystal scintillator. In this way, the crystal scintillator is used as an anticoincidence guard to reduce background from external gamma and cosmic radiation when the counter is used as a liquid scintillation beta counter.

When used as a gamma counter the electronic system very efficiently records events in the gamma scaler 16. By using pulse shape analysis, background signals such as electronic noise and Cerenkov radiation in the photodetector envelope are rejected.

EXAMPLE

Figure 6:
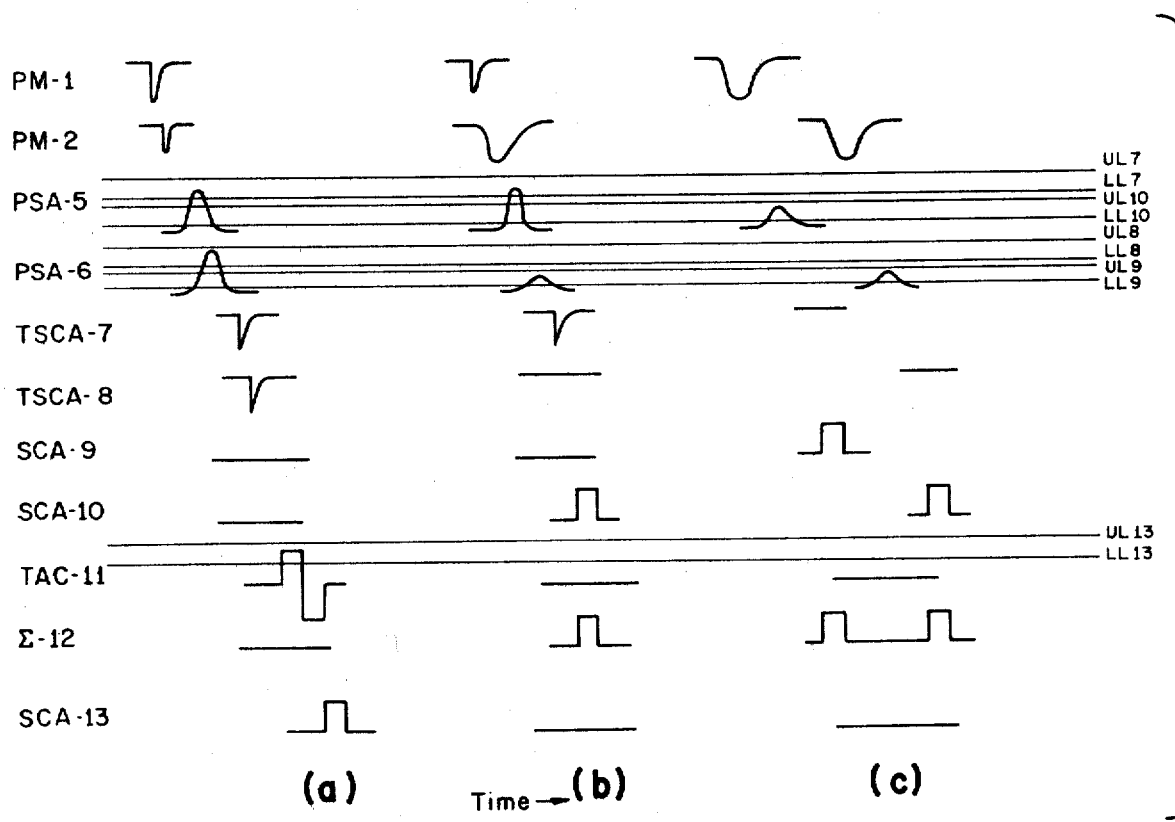
FIG. 6 shows pulse shape and timing diagrams.

By way of illustration, pulse shape and timing diagrams for a two phototube apparatus are shown in FIG. 6. These were obtained using a detector-guard fabricated of two 2 inch diameter, 1 inch length NaI(Tl) crystals in the from of cylinders joined end-on-end, and provided with a 1⅜ inch diameter hole at the joint perpendicular to the center axis whereby each crystal had a half cylindrical hole. The detector guard was constructed as shown in FIG. 1, with two RCA 4501 V4 phototubes being optically coupled to the flat faces at each end of the joined cylinders. A 1¼ inch diameter, 1.0 mm wall thickness quartz sleeve was optically coupled to the crystal within the cylindrical hole as described hereinbefore. A magnesium oxide powder was used as a photon reflector; and a 0.5 mm walled aluminum housing covered the entire detector and phototube, and was hermetically sealed to the quartz sleeve. Fabrication of the detector was effected in a dry box to eliminate hydration of the NaI(Tl) crystal during processing and encapsulation.

A liquid cocktail consisting of 15 milliliters of toluene, 100 milligrams of 2,5 diphenyloxazole fluor, and a 50 microliter aliquot of $^{14}C$ labeled toluene of 4.15 × $10^5$ dpm/milliliter activity was placed in a 20 ml sample vial which was inserted into the sample chamber. Light-tight fittings were placed over the two openings of the detector housing, and the phototubes were then integrated into a high voltage source and an electronic circuit.

The electronic circuit used in the evaluation of the pulses originating from true $^{14}C$ beta decay events within the liquid fluor, and those from external gamma radiation was that shown in FIG. 5. These pulses were observed and measured for output wave form from the various electronic components using a fast 75MHz or greater oscilliscope as shown in FIG. 6. FIG. 6a corresponds to beta emmission by a $^{14}C$ sample in the liquid scintillator. FIG. 6b depects an external gamma or cosmic ray event where energy is deposited in both the liquid and crystal scintillators; and finally 6c corresponds to the system used as a gamma counter.

Figure 7:
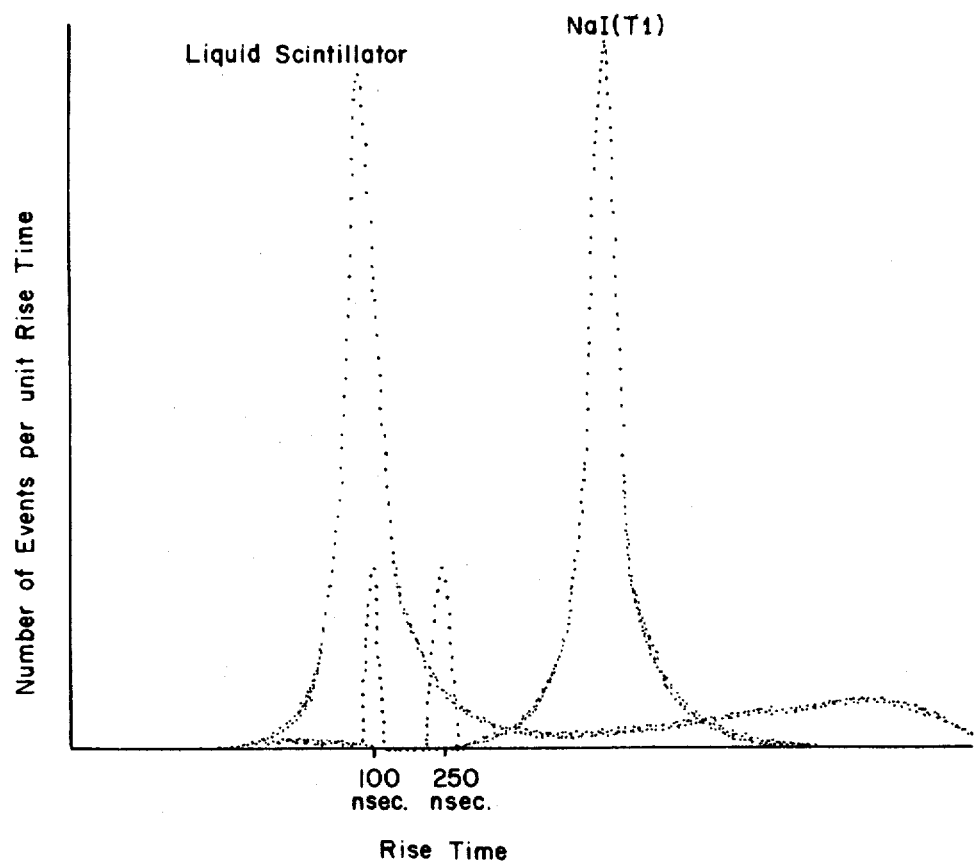
FIG. 7 is a pulse rise time diagram.

FIG. 7 shows the distribution of measured output pulses from the pulse shape analyzer detecing the slow and fast rise time scintillations originating from the liquid fluor and the crystal guard detector. When the counter was used solely as a gamma ray detector, the electronic components shown in FIG. 5 consisted of PSA5, PSA6, SCA9 and SCA10, ε-12 and detected events were recorded in gamma scaler 16.

Figure 8:
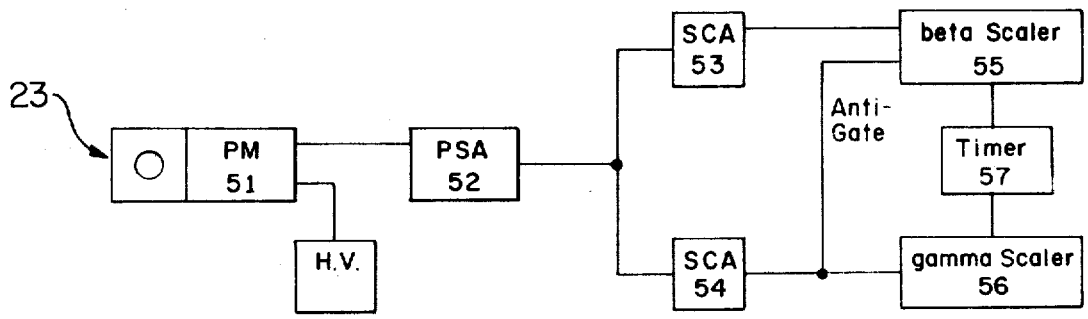
FIG. 8 is a block diagram of a single tube electron circuit.

The electronic circuit of the single tube counting system (FIG. 8) has the same type of radiation detector as the two-tube system, but has only one photodetector PM-51 optically coupled to radiation detector 23. The photodetector PM-51 is identical to the photodetector used in the two-tube system. The fast anode pulse is fed to a pulse-shape analyzer PSA-52. As before the output of the pulse-shape analyzer is proportional to the waveform and independent of the amplitude of the incoming signal. The output of PSA-52 is fed to two pulse-height analyzers SCA-53 and SCA-54. The upper and lower discriminators of SCA-53 are set to accept fast pulses which originated in the liquid scintillator. The slow unipolar output of SCA-53 is accumulated in beta scaler-55, which records the number of events which originated in the liquid scintillator. The upper and lower discriminator of SCA-54 are set to accept longer duration events originating in the crystal scintillator. The slow unipolar output of SCA-54 is accumulated in gamma scaler-56, which records the number of events which originate in the crystal scintillator. The output of SCA-54 may also be used as an anticoincidence gate for scaler 55 to prevent the recording of an event in scaler 55 when an event has been detected by the crystal scintillator. In this way the crystal radiation detection acts as a gamma and cosmic-ray shield. Timer 57 controls both accumulators so that count rates may be determined; whereas timing and wave-form diagrams have been shown for scintillation events originating in the liquid scintillator. This combination liquid and crystal scintillator detector unit can also be used with conventional liquid scintillation electronics which use pulse height and coincidence discrimination. The reason being that there is a large difference in amplitude between pulses which originate in the liquid scintillator as compared to those which originate in the crystal scintillator. The pulse shape sensing circuitry described above can be easily modified for this mode of operation by replacing the pulse shape analyzers with conventional preamplifiers, amplifiers and a pulse height analyzer.

We shall now consider the operation of the crystal-detector guard of this invention. The detector-guard can function in three modes of operation depending on its use either as a (1) passive light pipe and (2) external radiation guard for beta liquid scintillation counting or as (3) a gamma radiation detector.

The passive light pipe mode of operation is functional in liquid scintillation counting when photons originating from the phosphor in the liquid sample derived from the beta decay of radioactive material pass through the glass vial and enter the crystal detector-guard through a quartz window surrounding and acting as an outer wall of the detector-guard housing. The photons traverse through the crystal and are detected and converted to an electrical pulse by the photomultiplier tubes. Photon transmission through the crystal detector is very efficient for the following reasons: (1) The wave length of the photons emitted from the liquid scintillator is between 3500–4200 Angstroms. Crystal detectors such as NaI(T1) and CsI(T1) have low optical density for this wave length and therefore, possess high photon transmittency. (2) The crystal detectors are coated with metal oxide on their side walls to act as photon reflectors. Chosen for their high reflectivity at 3500–4200 Angstrom wave length, they minimize photon wall absorbency and insure a high number of photons reach the photomultiplier tubes. (3) The quartz window, in which the photons from the liquid vial must traverse to enter the crystal detector, and the optical seal of the crystal to the photomultiplier tube also have low absorbency for photons so that a minimum are lost crossing these two barriers on their pathway to the phototubes.

The guard detector is used to lower the background of the liquid counter by detecting those scintillations in the liquid vial which originate from outside radiation. The guard detector functions as an additional radiation detector to that of the liquid counter. It is constructed so as to almost completely surround the sample vial, to be positioned between the vial and the phototubes and to be optically coupled to each. The guard functions by detecting incoming radiation through the scintillating effect in the crystal shield. Some of this same energy will be energetic enough to also find its way into the liquid vial and cause it to also scintillate. Photon production from valid beta decay within the liquid fluor will be of relatively low intensity. External radiation may also cause the liquid fluor to scintillate similar to that of the beta decay and therefore be recorded as a false beta decay event. However, before external radiation can enter the liquid vial, it will necessitate passage through the guard detector which scintillates at a much higher photon intensity. The phototubes will view external radiation as an intense composite photon production of that of the cystal detector and the liquid fluor where true beta decay within the sample vial will be at a much lower photon level. Light pulses originating from the scintillation liquid and the crystal detector-guard can be differentiated from each other in two ways.

One way is by the conventional pulse height analysis method were weak photon production originating from the liquid sample is a very much less intense pulse than those pulses originating from photon production within the crystal guard. In this method pulses are measured according to their pulse amplitude which is proportional to the scintillation intensity. By setting discriminators (reference voltages) at certain pulse height settings, pulses of different amplitude can be sorted out. Pulse of low amplitude originating from solely a beta decay in the liquid fluor are of low amplitude and are directed to a registrar for coincidence evaluation. Pulse of high amplitude from the cystal or crystal-liquid fluor representing external radiation are directed to an electronic gate register. If the guard detects a scintillation at nearly the same time interval that the vial produces a scintillation, then the vial scintillation, although recorded as a coincidence pulse by both the phototubes and allowed to pass, is stopped electronically by the electronic gate. The guard gate is called an anticoincidence gate and is activated on pulses passing the coincidence gate. Pulses which pass the coincidence gate and anticoincidence gate represent only true beta pulses originating in the liquid sample vial and are recorded on a beta scaler register.

A second procedure, and one that is unique to this invention is to use the difference in the short decay time of the liquid scintillator as compared to the long decay of the NaI(T1) crystal detector. The liquid scintillations have an average flourescence decay time of from 2–5 nanosecs and thereby a proportionally rapid pulse rise and/or decay time. In contrast to this a NaI(T1) crystal has a relatively long fluorescence decay time of greater than 300 nanosecs and a proportionally slow pulse rise and/or decay time. By measuring the rise and/or decay time of the pulses arriving from the photomultiplier tubes, one can differentiate or sort out those pulses originating from liquid scintillator and those pulses from the crystal detector-guard. Therefore, it can be determined what events are true events originating from the liquid and those from the crystal detector. When the detector guard is used as an electronic shield to identify and electronically eliminate external radiation interacting with the liquid sample and causing it to scintillate, it is used in an anticoincidence mode. As a result, of a slow and fast fluorescence pulse, seen by the two phototubes a coincidence circuit will be initiated and a pulse allowed to pass in the circuitry. However, that portion of the total photon production representing a slow decay fluorescence coming from the crystal guard will activate the anticoincidence gate and the pulse will be voided and not allowed to pass, so it will be not recorded. Only pulses of fast rise and/or decay time originating from the beta decay in the liquid sample which are not accompanied by slow rise and/or decay pulses of the crystal guard are allowed to pass the coincidence and anticoincidence gates and be recorded in an appropriate register.

In the case where the crystal detector guard is to be used as solely a gamma detector and not as a guard detector, the anticoincidence gate is disconnected. In this mode of counting the glass vial contains no solvent or fluor, only the gamma emitting isotope to be counted and the crystal guard formerly used as a shield becomes a crystal gamma detector. All pulses are directed to a pulse height analyzer and differentiated solely according to their pulse height and recorded in appropriate scalers.

A second facet of this detector-guard crystal is that it is so efficient in sorting out extraneous radiation from true liquid scintillation pulses that the detector-guard can be used with only one photomultiplier tube rather than two. Pulses originating in both the liquid scintillator and the crystal guard can be sorted both by their pulse amplitude or as pulse shaping (difference in rise or decay flourescence time) as was outlined with the two-tube counter. In this mode of counting, a coincidence system is not employed since there is only one phototube. As a result, a liquid scintillation counter employing only one phototube will have a slightly lower counting efficiency since it will have less than $4\pi$ geometry and it will have a higher background count, that being what is contributed by electronic phototube noise. The single tube liquid counter can also be employed as a gamma radiation counter by using the crystal guard as a crystal detector. In this mode of operation the sample vial holds a solid gamma sample and the crystal phosphor is used solely as a detector and the pulses are sorted by conventional pulse height analysis.

The thickness of the detector-guard crystal (defined as the pathlength of the photons from the front quartz face of the detector-guard to the interface of the crystal and phototube) need not be extensive in order to be an effective detector-guard. Thickness of the crystal will vary with intended use. If the detector-guard is to be used primarily for a low energy gamma ray detector for counting samples within the glass vial such as the weak 35 keV radiations of Iodine 125, then the crystal will need only be a few millimeters thick. If high energy detection is required, say for external cosmic radiation detection used primarily to lower the counter background level, then a thickness up to several inches can be used without appreciably diminishing the detection of the photon transmission from the liquid sample and therefore decreasing the counting efficiency of the liquid counter.

It can thus be seen that a number of variations are possible within the spirit of this invention. As an example several metal oxides can be selected as reflecting coating materials for the sodium iodide (Tl) crystal. Oxides of metals having molecular weights of 40 to 150 are effective, for instance, magnesium, calcium, barium and titanium. In addition any of the known inorganic phosphors such as those described in the background of this invention can be employed in the construction of the counting chamber. A variety of optical couplers having photon absorbencies of less than 20 percent at wavelengths of 3500 to 4200 Angstroms are also available in addition to quartz and the epoxy glue or silicone grease. Examples are lucite, clear plastic materials such as polymethylmethacrylate, and clear liquid polymers. Also a variety of photosensing devices, other than photomultiplier tubes, such as photodiodes can be used to detect the photon emission from the liquid and inorganic fluors. These and other modifications occuring to those skilled in the art are deemed to be within the scope of this invention.

What is claimed is:

1. In liquid scintillation counting apparatus for measuring the energy of beta particle decay events, the apparatus including a light-tight housing impermeable to beta radiation, a photomultiplier tube encased in said housing by means such that outside light does not enter the housing, a well-type sample chamber, a transparent sample vessel therefor, an optical coupling medium interposed between the sample vessel chamber and photomultiplier tube so that substantially all of the photons generated by a scintillator in the sample vessel are transmitted through the optical coupling into the photomultiplier tube, and means such as shielding and in-dependent detection for excluding background radiation, the improvement wherein background radiation is simultaneously counted and sorted from true beta events, including (a) as the optical coupling medium, an inorganic phosphor, (b) an optical sample well liner to protect the inorganic phosphor from atmospheric attack, the optical liner having a photon absorbency of less than 20 per cent as wavelengths in the range of 3500 to 4200 Angstroms, and (c) discriminator means for differentiating low amplitude, fast rise time, liquid scintillator-generated pulses from large amplitude, slow rise time, inorganic phosphor-generated pulses.

2. The apparatus of claim 1 wherein the optical coupling medium is a large single crystal of thallium activated sodium iodide.

3. The apparatus of claim 1 wherein the optical coupling medium is a large single crystal of thallium activated cesium iodide.

4. The apparatus of claim 1 wherein the optical coupling medium is two or more crystals of thallium activated sodium iodide bonded together to form the coupling medium.

5. The apparatus of claim 2 wherein the well liner is a quartz sleeve optically coupled to the NaI(Tl) crystal chamber walls with silicone grease.

6. The apparatus of claim 2 wherein the discriminator means is a bialkali cathode, gallium phosphide dynode, end-on, photomultiplier tube optically coupled to the NaI(Tl) crystal with epoxy glue.

7. The apparatus of claim 2 wherein a quartz sample chamber liner and the photomultiplier tube are optically coupled to the NaI(Tl) crystal with epoxy glue, wherein a photon reflecting coating, an oxide of a metal having a molecular weight of 40 to 150, covers all of the surfaces of the NaI(Tl) crystal except those containing the epoxy glue, and wherein the housing is of low atomic number metal selected from the group consisting of aluminum, magnesium, and beryllium.

8. The apparatus of claim 2 wherein the sample chamber is formed in one end of the housing, a single photomultiplier tube is optically coupled to the opposite end, and the discriminator means is an electronic circuit means including a pulse amplification means, pulse height discriminator, and anti-coincidence gates for pulse height analysis.

9. The apparatus of claim 2 wherein the sample chamber is formed in one end of the housing, a single photomultiplier tube is optically coupled to the opposite end, and the discriminator means is an electronic circuit means which includes rise time sensitive circuitry and anti-coincidence gates for pulse shape analysis.

10. The apparatus of claim 2 wherein the sample chamber is formed in the center of the light-tight housing between two photomultiplier tubes optically coupled to each end of the optical coupling medium, and wherein the discriminator means is an electronic circuit means which includes pulse amplification means, a coincidence gate, pulse summing means, pulse height discriminator means and anti-coincidence gates for pulse height analysis.

11. The apparatus of claim 2 wherein the sample chamber is formed in the center of the light-tight housing between two photomultiplier tubes optically coupled to each end of the optical coupling medium, and wherein the discriminator means includes rise time sensitive circuitry, a coincidence gate and an anti-coincidence gate for pulse shape analysis.

* * * * *